United States Patent [19]

Cueman et al.

[11] Patent Number: 4,870,279
[45] Date of Patent: Sep. 26, 1989

[54] HIGH RESOLUTION X-RAY DETECTOR

[75] Inventors: Michael K. Cueman, Niskayuna; Casmir R. Trzaskos, Amsterdam; Lewis J. Thomas, III, Schenectady; Charles D. Greskovich, Niskayuna, all of N.Y.

[73] Assignee: General Electric Company, Schenectady, N.Y.

[21] Appl. No.: 208,629

[22] Filed: Jun. 20, 1988

[51] Int. Cl.⁴ ............................................... G01T 1/202
[52] U.S. Cl. ..................... 250/368; 250/366; 250/367; 250/370.09; 250/370.11
[58] Field of Search ........... 250/368, 367, 366, 370.09, 250/370.11

[56] References Cited

U.S. PATENT DOCUMENTS

| 4,421,671 | 12/1983 | Cusano et al. | 252/301.4 |
| 4,525,628 | 6/1985 | DiBianca et al. | 250/367 |
| 4,560,877 | 12/1985 | Hoffman | 250/370.11 |
| 4,560,882 | 12/1985 | Barbaric et al. | 250/368 |
| 4,725,734 | 2/1988 | Nishiki | 250/366 |

FOREIGN PATENT DOCUMENTS

| 85979 | 5/1984 | Japan | 250/367 |
| 86480 | 5/1985 | Japan | 250/370.11 |

OTHER PUBLICATIONS

B. P. Flannery et al, "Three-Dimensional X-Ray Microtomography", Science, 237, Sep. 1987, 1439-1444.

Primary Examiner—Carolyn E. Fields
Attorney, Agent, or Firm—Donald R. Campbell; James C. Davis, Jr.; Paul R. Webb, II

[57] ABSTRACT

An imaging X-ray sensor is composed of a linear array of microscopically small bars of polycrystalline ceramic scintillator material bonded at the bar ends to an integrated circuit photodetector array. The scintillator bars are the basic resolution elements of the detector and are less than 50 microns in width. Each bar produces a flash of light with intensity related to the X-ray flux penetrating the bar. A reflective coating covering five surfaces of the bars isolates each detector element and channels the light into the photodetector bonded to one end of the bar. A method of fabricating the detector array utilizes the machineability and good mechanical strength of scintillators such as rare earth oxides doped with rare earth activators.

15 Claims, 4 Drawing Sheets

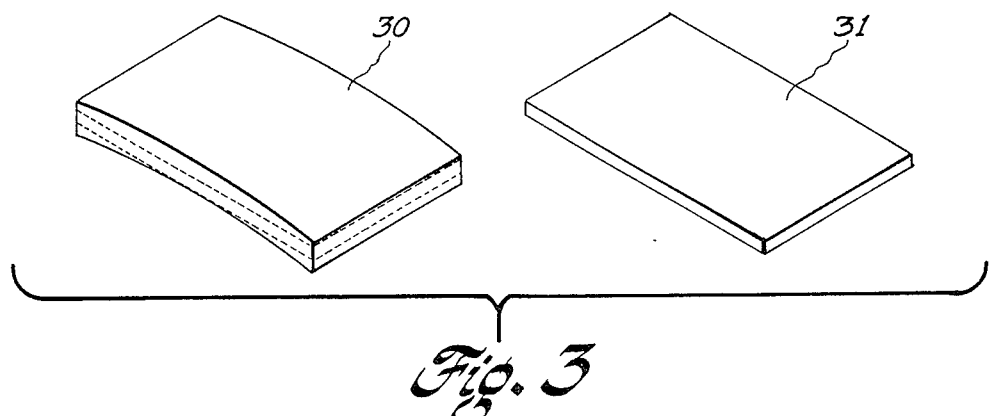
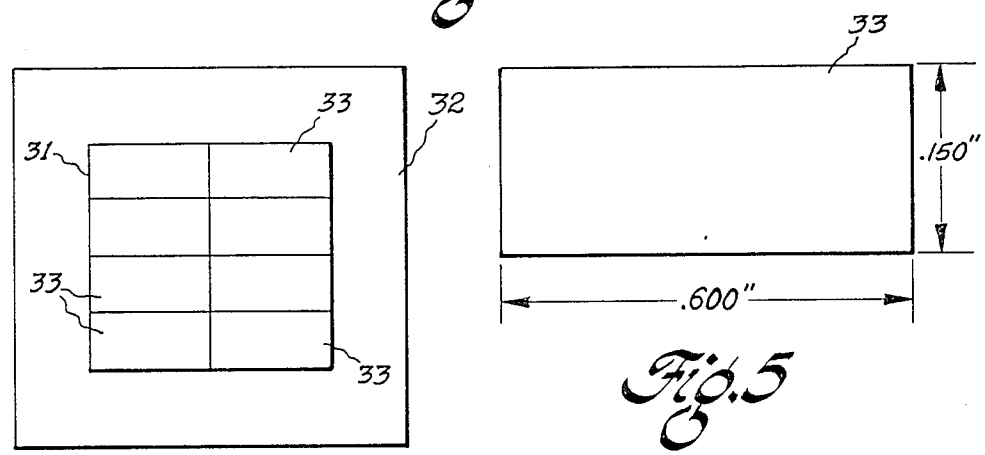
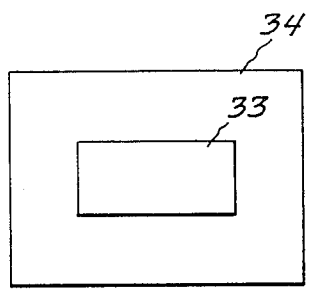
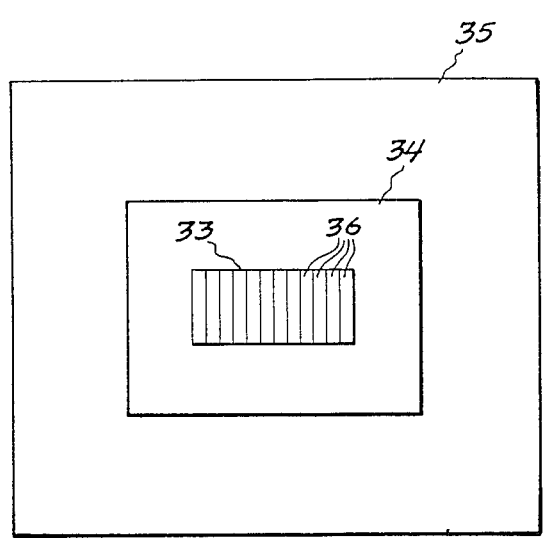

HIGH RESOLUTION X-RAY DETECTOR

BACKGROUND OF THE INVENTION

This invention relates to X-ray detectors and especially to a solid state detector array having significantly improved spatial resolution and to a method of fabricating the same.

Current X-ray detectors do not have adequate spatial resolution for the inspection of many new industrial parts. Composite materials, high density electronics, ceramics, and even high performance applications of traditional metal alloys are susceptible to failure due to the presence of very small flaws. In many cases the critical flaw size is below the resolution limit of conventional digital radiography and computed tomography detectors. One of the best current industrial X-ray CT systems is equipped with a detector capable of resolving features down to about 200 microns. The critical flaw size in graphite composites, however, is thought to be 25 to 50 microns. Similarly, prototype military electronics are now being assembled on circuit boards with conductive patterns only 100 microns in width.

Extension of digital X-ray radiography and computed tomography to this growing class of high performance parts requires a detector which combines improved spatial resolution with other performance advantages including soft energy X-ray sensitivity, low inter-element cross talk, reduced noise, and small physical size.

Other types of X-ray detectors for industrial inspection applications include high pressure xenon ionization, monolithic scintillator, and fiber optic scintillation detectors. All of these have shortcomings. Xenon ionization chambers are resolution limited at about 100 microns by charge spreading in the ionized gas; they require bulky pressure vessels and complex, high impedance cabling which necessitates stationary installation. Xenon detectors have a pressure vessel enclosure which absorbs part of any soft X-ray signal before it reaches the active elements of the detector. Fiber optic scintillator detectors have deficient channel independence; these scintillators capture only a fraction of their scintillation light in true fiber core transmission mode. A large part of their light output scatters among the fibers and contributes to signal coupling between widely separated detector elements.

An ultra high resolution X-ray detector with a 1 to 2 micron resolution is described by B. P. Flannery et al. in "Three-Dimensional X-ray Microtomography", Science, 237, Sept. 1987, 1439–1444. This detector has a cellular phosphor plate for conversion of X-rays to optical light; the image is magnified with a lens system and focused onto a solid state charge-coupled detector. Low energy synchrotron X-ray radiation is utilized, not a practical source for a nondestructive evaluation (NDE) testing instrument and the energy output is too low for most industrial testing.

The high density polycrystalline ceramic scintillator materials in the detectors of this invention are rare earth oxides doped with rare earth activators. Such a scintillator has been extensively patented by the assignee—two are patents 4,421,671 and 4,747,973. A solid state X-ray detector having an array of scintillation elements made of this material is described in patent 4,525,628. Millimeter width scintillator elements separated by vertical collimators are disclosed in a detector suitable for fast medical CT scanning. The advantageous properties of the scintillators for this and other applications are set forth, including their superior light transmittance, good conversion efficiency, high X-ray stopping power, production of light at a wavelength compatible with available integrated circuit photodetectors, and superior physical properties.

SUMMARY OF THE INVENTION

An object of the invention is to provide an X-ray detector with unique advantages for digital radiography and computed tomography imaging of industrial parts at high spatial resolution.

Another object is to provide an improved high resolution X-ray detector having a linear array of polycrystalline ceramic scintillators of significantly smaller size than heretofore and a method of fabricating such an array and detector.

Yet another object is to provide an improved solid state X-ray detector that is efficient, matched to silicon integrated circuit sensors, has low cross talk and coupling between elements, is small and maneuverable, and has good soft X-ray sensitivity.

One aspect of the invention is an improved high resolution X-ray detector having a linear array of elongated scintillator bars made of dense polycrystalline rare earth ceramic material which are arranged column fashion and convert X-rays penetrating a front surface of the bars into scintillation light. A support plate is adhered to the back surface of the linear array. The ends of the scintillator bars are bonded to an integrated circuit photodetector array that generates electrical signals related to X-ray intensity. A reflective coating covers all surfaces of the scintillator bars except the ends bonded to the photodetectors and provides mechanical support and redirects and channels the scintillation light in every bar to the photodetector attached to it.

The scintillator bars, which may be comprised of rare earth oxides doped with rare earth activators for luminescence, have a rectangular cross section and a front surface width of less than 50 microns. The spatial resolution of the device is limited only by the ability to cut smaller bars. Another feature is the combination with such a physically small and rugged array of a slit collimator to limit X-rays to a region of the scintillator bars sufficiently above the photodetector array to protect the latter from scattered X-ray damage.

A method of fabricating the improved linear array detector is as follows. A wafer of the polycrystalline ceramic scintillation material is mounted on a temporary base plate and cut, for instance with a dicing saw, into an array of bars having a width less than 50 microns. After mounting lapping shims on the base plate, a reflective coating is applied which completely fills the spaces between the individual bars. The reflective coating may be a mixture of an adhesive and light refracting particles such as epoxy and rutile titanium dioxide particles. The shims and excess coating are lapped off and back surfaces of the scintillator bars are polished. A support plate is adhered to the back surface of the array of bars and wafer using the reflective coating as the adhesive. The temporary base plate is lapped off and any continuous wafer surface, and the front surfaces of the bars are polished. The array of bars and support plate are cut out to the proper size and the foot end of the linear array is mounted on an integrated circuit photodetector array. Finally, all exposed surfaces of the scintillator bars are covered with the reflective coating.

BRIEF DESCRIPTION OF THE DRAWINGS

FIGS. 3–15 show steps in the fabrication of the scintillator array and attached support plate.

DETAILED DESCRIPTION OF THE INVENTION

Figure 1:
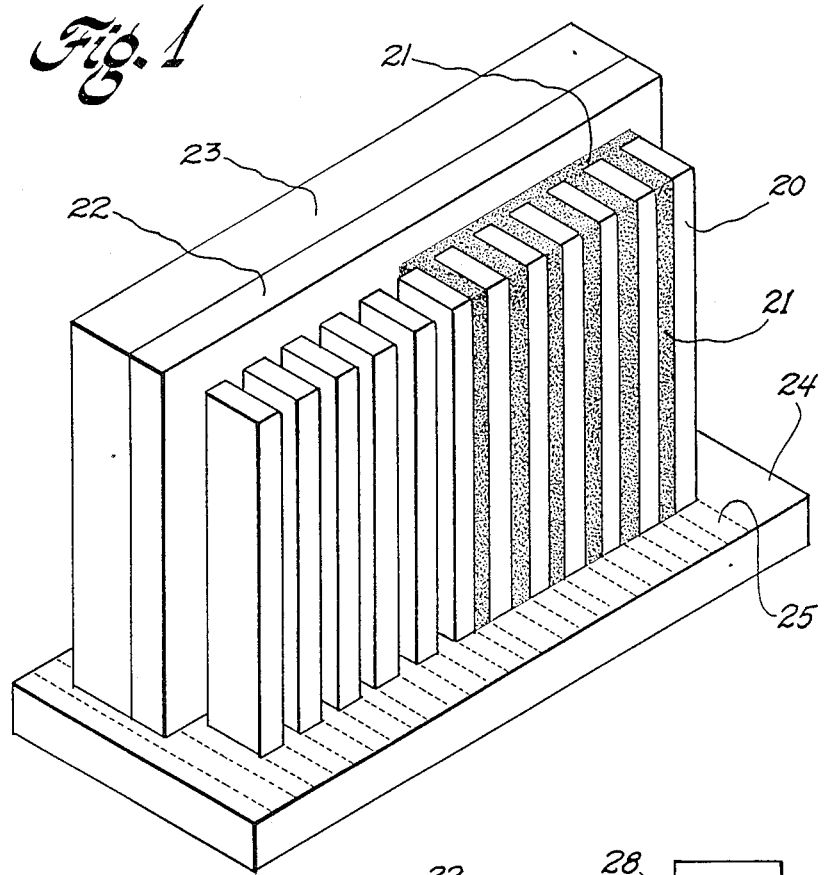
FIG. 1 is a perspective view of the array of scintillator bars, support plates, and photodetector integrated circuit at an intermediate stage of manufacture of the detector.
Figure 2:
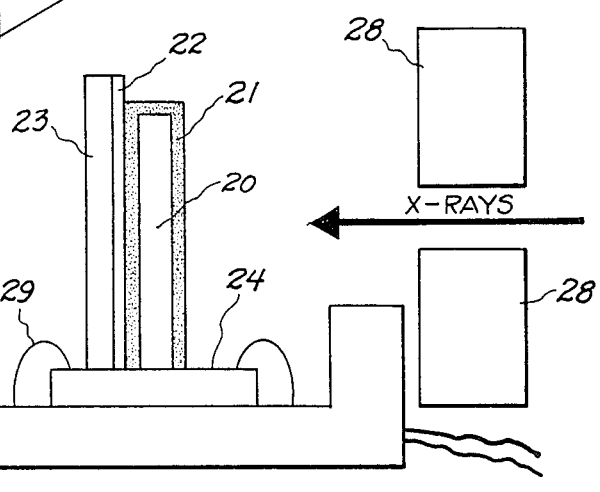
FIG. 2 is an end view of the assembled X-ray detector.
Figure 8:
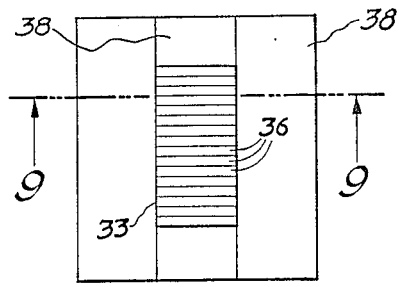

The high resolution X-ray detector array is shown schematically in FIG. 1 and is comprised of a linear array of scintillator bars 20 arranged column fashion. Referring also to FIG. 2, the bars 20 have a coating 21 of reflective material on all surfaces except their bottom ends, and the reflective coating completely fills the spaces between the bars. Each bar 20 is one pixel or element in the linear array detector. The scintillator bars 20 are held in an evenly spaced line by adhesive attachment to one or more support plates 22 and 23 which have no special properties. The bottom surface of the assembled scintillator blocks and their support is optically flat and polished, and is bonded directly to the silicon dioxide surface of an integrated circuit array of photodetectors 24 which forms the basis of the detector. The integrated circuit detector array 25 consists of a line of individual photosensitive areas 25 and the circuitry necessary to read the cells individually. Either charge-coupled device (CCD), charge-injection device (CID), or bipolar photodiode technologies can be used. The scintillator bar, support plate, and integrated circuit photodetector array assembly is mounted on a chip carrier 26 which has contacts 27.

In an imaging application, the X-ray detector is positioned behind a slit collimator bar 28 made of a dense material like tungsten or lead. The collimator and its horizontal slit limits the X-rays to a plane and permits X-rays to penetrate only a section of the scintillator bars 20 a fraction of an inch above the plane of the integrated circuit photodetector array 24. The X-rays which hit in this section generate visible light which is redirected by the reflective coating 21 down to the photodetector array 24, converted into an electrical signal which passes over wires 29 to the chip carrier 26 and is automatically transferred to a computer to form the final image. The collimator 28 protects the integrated circuit photodetector array 24 from damage by the direct X-ray beam. The distance between the scintillating region of the bar 20 and the integrated circuit 24 protects the silicon device from scattered X-ray damage. High energy X-rays which are not stopped by the scintillator bars 20 simply pass into the support plates 22 and 23 which are typically made of aluminum or glass. The reflective coating 21 of the scintillator bars is a mixture of a low index of refraction adhesive and high index of refraction particles like rutile titanium dioxide. This coating is a diffuse reflector and provides efficient transfer and channeling of the scintillation light down to the photodetector, and physical support of the scintillator bar array. Each detector element of the array is isolated by the reflective coating.

Arrays of polycrystalline rare earth ceramic scintillation material have been produced in which the bars 20 are 1,000 to 2,500 microns tall, 25 to 50 microns wide at the front surface, and 150 to 200 microns deep. The front surface width is desirably as small as possible to provide increased spatial resolution, and improved X-ray stopping power is obtained by increasing the thickness. These bars are mounted in an epoxy-titanium dioxide matrix; more particularly, the reflective coating 21 is a mixture of epoxy and rutile titanium dioxide particles. Arrays more than 1 centimeter wide have been mounted on integrated circuit photodiode detectors made by the Reticon Corporation with 512 diodes on 25 micron centers.

The cubic polycrystalline ceramic scintillation material is described in the foregoing patents and is comprised of rare earth oxides doped with rare earth activators. More particularly the X-ray detector scintillator may be made of yttrium oxide and gadolinium oxide which is rare earth activated for luminescence by one or more of europium oxide, neodymium oxide, ytterbium oxide, and dysprosium oxide. One composition that gives good results includes 66.7 mole % yttrium oxide, 30% gadolinium oxide. It has a cubic structure, good 0.3% ytterbium oxide. It has a cubic structure, good X-ray stopping power, efficiently converts X-rays to scintillation light, and there is low afterglow effect. More information is given in U.S. Pat. No. 4,421,671, the disclosure of which is incorporated herein by reference. In order to make a fine structure and such microscopically small bars, the scintillator has to be machineable and have a fine grain size and superior mechanical strength. These scintillator compositions are illustrative and not intended to be limiting.

The X-ray detector of this invention advances the state of the art in linear array detectors in the following ways. As to resolution, the resolving elements of this detector are independent bars of scintillator embedded in a reflective matrix. The spatial resolution of the final device is limited only by the ability to physically cut smaller blocks. Using the methods to be described, detector block bars only 25 microns wide have already been made. As to efficiency, the high density polycrystalline rare earth ceramics scintillator stops more X-ray in less volume than either gas or low density scintillators. Furthermore, the material produces more light at a color, with a wavelength of 610 nanometers in the red spectrum for the europium activator, better matched to silicon integrated circuit sensors than other media. These factors combine to produce a small device with high signal efficiency. As to channel independence, the reflecting media surrounding each scintillator bar efficiently channels its scintillation light into the photodiodes attached to it. There is only one glue interface between the scintillators and the photodetectors. This design reduces the cross talk and coupling between elements to less than levels commonly seen in other scintillator designs. As to maneuverability, since the scintillator bars are embedded in a reflective medium and directly bonded to an integrated circuit photodetector array, the device is both rugged and compact. Amplifiers on the photodetector chip convert the outputs signals to a multiplexed, simply cabled form. This results in a small, robust detector which can be easily manipulated into small openings for convenient inspection of oddly shaped objects. As to soft X-ray sensitivity, small assemblies of composite materials are best inspected with soft X-rays generated by tubes excited by less than 100 KVP. This detector is especially sensitive to those easily absorbed X-rays because the scintillator bars are only shielded by a thin layer of optical reflector, the reflective coating.

This detector design has been demonstrated in practice. The spatial resolution of prototype detectors was demonstrated by resolving solder flaws and short circuits in microelectronics packages which were undetectable with xenon based imagers. Measurements with lead stripe gauges show spatial resolution of more than 15 line pairs per millimeter in a magnification two imaging geometry. Soft X-ray sensitivity was illustrated with digital radiography images of carbon composites and plastic extrusions.

These accurately assembled arrays of microscopic parts require special fabrication techniques which constitute another aspect of the invention. Each stage of the fabrication sequence is illustrated in FIGS. 3–17. Referring to FIGS. 3–5, the starting point in the process is a relatively large slab 30 of polycrystalline rare earth ceramic scintillator material. The slab may be warped and is ground and lapped flat to a thickness of about 15 mils. Next, the flat slab 31 is mounted on a glass slide 32 and cut into a number of wafers 33 of a size somewhat larger than that of the finished design. The dimensions of one such wafer are given. In FIGS. 6 and 7, the scintillator wafer 33 is mounted on a temporary base plate 34 such as a microscope cover slide using epoxy adhesive. The base plate provides a convenient handle, especially after the wafer has been cut into an array, at which point it is very fragile. The wafer-base plate assembly 33, 34 is attached to a larger microscope slide 35 using a thermoplastic adhesive. The larger substrate is needed to mount the wafer on the vacuum chuck of the saw used to cut the array. A Micro Automation dicing saw, Model 1006, is used to cut the wafer 33 into the array of scintillator bars 36. The diamond saw can be programmed to make very uniformly spaced cuts of arbitrary spacing. The cutting is done using a Superior dicing wheel having a thickness of 0.0007 inches. The kerf produced by this blade is typically 0.00075 to 0.0008 inches. The cuts are made 10 to 12 mils deep and do not go all the way through the thickness of the wafer. The number of cuts made depends on the spacing and the length of the array. After cutting, the cut wafer-cover slide assembly 33, 34 is removed from the microscope slide 35 and cleaned to remove any cutting debris from the saw cuts.

Figure 9:
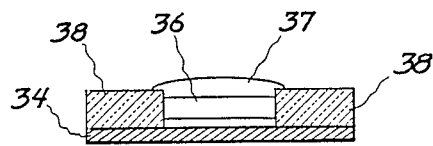
Figure 10:
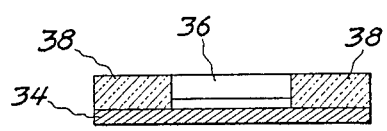
Figure 11:
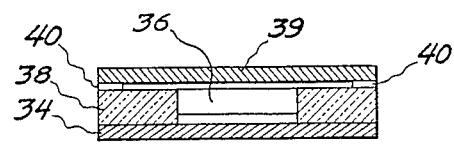
Figure 12:
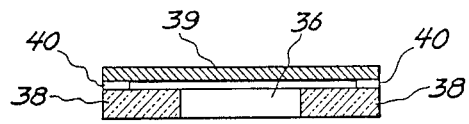

The next series of operations, FIGS. 8–12, involve lapping and polishing steps which serve to isolate the individual scintillator bars 36 and to remove defects, primarily chips, from the reflecting surfaces of the scintillator bars. The as-cut array of bars 36 is very fragile and requires mechanical support before lapping and polishing can proceed. This requirement is satisfied along with the need for optical isolation by filling the saw cuts with the reflective coating material 37, a 1:1 mixture by weight of epoxy and rutile titanium dioxide particles. This is shown in FIG. 9 which is a cross section taken through FIG. 8. At the same time, lapping pads 38 somewhat thicker than the cut wafer 33 and the array, are mounted about the perimeter of the array using the same epoxy-rutile titanium dioxide mixture. These pads serve to support the edges of the array of bars and also provide a larger lapping surface. After the epoxy, which is the adhesive, has cured the assembly is mounted on a lapping fixture again using a thermoplastic adhesive. The first lapping step is now carried out. In this step, FIG. 10, the lapping pads 38 are ground down to the thickness of the cut wafer 33, enough to expose the top surface of the scintillator bars 36. This surface, the back surface of the bars in the final assembly, is examined for flaws and further lapping is done as required, and the surface is polished to obtain a good finish. Standard lapping and polishing materials are used in these and the following steps.

The next step requires the assembly to be flipped over in order to remove the temporary base plate 34 and the continuous layer of polycrystalline ceramic scintillator material connecting the backs of the cut bars. The array still needs mechanical support and the just polished surface, the back surface of the array of bars in the final assembly, needs to be covered with an optically opaque reflective material. Both requirements are met by attaching an aluminum or glass support plate 39 to the just polished surface using the same epoxy-rutile TiO2 mixture as was used to fill the slots between the bars. One mil thick shims 40 are placed about the perimeter of the support plate 39 to ensure an adequate thickness of epoxy mixture over the polycrystalline ceramic scintillator bars. After the epoxy has cured, the assembly is removed from the lapping fixture, turned over and the back side is lapped and polished. The lapping must proceed far enough to remove the continuous layer of scintillator material and isolate the individual scintillator bars 36. The surface of the bars, the front surface in the final assembly, is then polished to a good finish.

Figure 14:
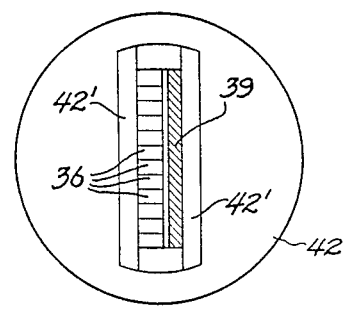
Figure 15:
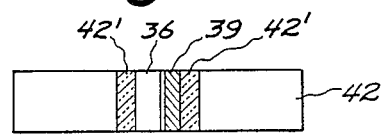
Figure 13:
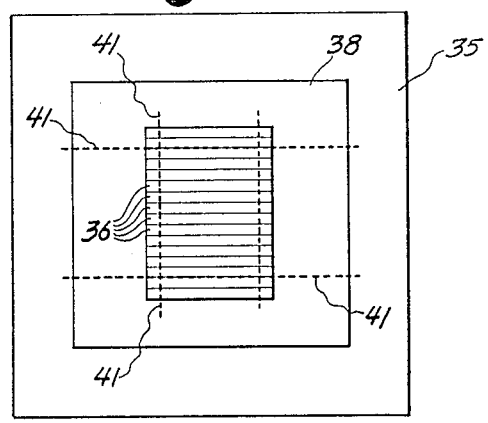
Figure 16:
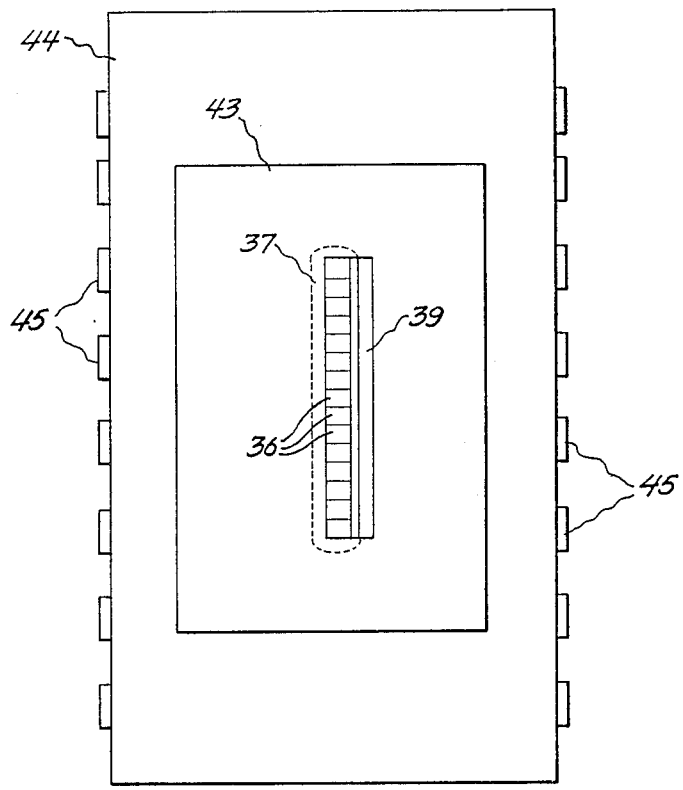
FIGS. 16 and 17 illustrate the final assembly and bonding the array to the photodetector integrated circuit and coating the scintillator bars with reflective material.
Figure 17:
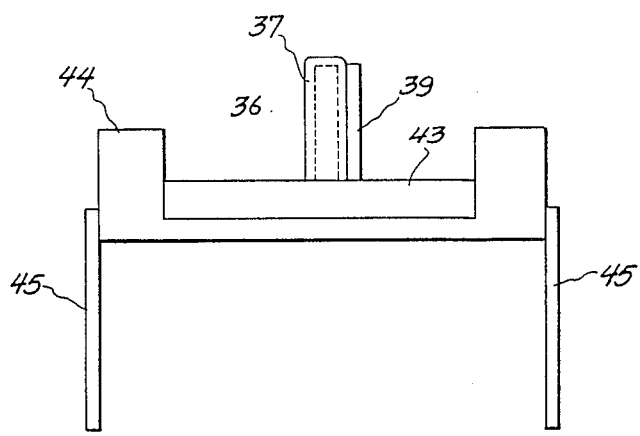

The array-support plate-lapping pad assembly is next put back on the dicing saw, FIG. 13, and diced out to the required dimensions as shown by saw cuts 41. A final lapping and polishing operation must be carried out on the end of the array which will be attached to the photodetector integrated circuit. A good optical coupling is needed between the ends of the scintillator bars and the photodetector surface. The cut-out array is held between clamps 42' on a fixture 42 as shown in FIGS. 14 and 15 to do the polishing. The array of bars 36 and attached support plate 39 are then adhered to the integrated circuit photodetector array 43, FIGS. 16 and 17, using an optical quality epoxy such as Epotek 301. After the epoxy has cured the remaining exposed surface of the array of scintillator bars 36 are covered with the reflective coating 37, the epoxy-rutile titanium oxide mixture. The photodetector integrated circuit 43 is illustrated already mounted on the chip carrier 44 which has contacts 45.

In conclusion, a high resolution X-ray detector tailored for nondestructive evaluation, such as the inspection of composite materials and small electronic assemblies, has been described. The detector is comprised of an array of miniature scintillation blocks or bars, each less than 50 microns wide, which are directly attached to an integrated circuit light sensor. The finely partitioned detector increases efficiency by permitting relatively long X-ray stopping paths without the resolution loss associated with light spreading in thick scintillator plates. The cubic polycrystalline rare earth ceramic scintillation material combines high light output with low afterglow and favorable micro-fabrication properties.

While the invention has been particularly shown and described with reference to a preferred embodiment, it will be understood by those skilled in the art that the foregoing and other changes in form and details may be made without departing from the spirit and scope of the invention as defined in the appended claims.

The invention claimed is:

1. A high resolution X-ray detector comprising:
   a linear array of elongated polycrystalline ceramic scintillator bars arranged column fashion and converting X-rays penetrating a front surface of said bars into light;
   a support plate adhered to a back surface of said linear array;
   an integrated circuit photodetector array bonded to one end of said scintillator bars to generate electrical signals related to X-ray intensity; and
   a reflective coating on all surfaces of said scintillator bars except the ends bonded to said photodetector array to provide mechanical support and channel the scintillation light to be detected.

2. The detector of claim 1 wherein said scintillator bars are comprised of rare earth oxides doped with rare earth activators.

3. The detector of claim 1 wherein said scintillator bars have a rectangular cross section and a front surface width of less than 50 microns.

4. The detector of claim 3 wherein said reflective coating is a mixture of adhesive and light reflecting particles and is a diffuse reflector.

5. The detector of claim 3 wherein said support plate is aluminum.

6. The detector of claim 3 wherein said support plate is glass.

7. A high resolution X-ray detector comprising:
   a linear array of elongated, rectangular cross section, polycrystalline rare earth ceramic scintillator bars arranged column fashion and converting X-rays penetrating a front surface of said array into visible light;
   a support plate adhered to a back surface of said array;
   an integrated circuit photodetector array bonded to one end of said scintillator bars to generate a set of electrical signals related to detected X-ray intensity; and
   a reflective coating on all surfaces of said scintillator bars except the ends bonded to said photodetector array, completely filling spaces between said bars, to provide mechanical support and redirect and channel the scintillation light in every bar to the attached photodetector.

8. The detector of claim 7 wherein said scintillator bars have a front surface width of less than 50 microns.

9. The detector of claim 8 wherein said scintillator bars are made of yttrium oxide combined with gadolinium oxide which is rare earth activated for luminescence.

10. The detector of claim 7 wherein said reflective coating is a mixture of epoxy and rutile titanium dioxide particles and is a diffuse reflector.

11. In combination, a high resolution x-ray detector and a slit collimator, said x-ray detector comprising:
    a linear array of elongated polycrystalline ceramic scintillator bars arranged column fashion and converting x-rays penetrating a front surface of said bars into light;
    a support plate adhered to a back surface of said linear array;
    an integrated circuit photodetector array bonded to one end of said scintillator bars to generate electrical signals related to x-ray intensity;
    a reflective coating on all surfaces of said scintillator bars except the ends bonded to said photodetector array to provide mechanical support and channel the scintillation light to be detected;
    said slit collimator being positioned in front of said linear array so as to limit x-rays to a section of said scintillator bars sufficiently above said photodetector array to protect the latter from scattered x-ray damage.

12. A method of fabricating an X-ray detector having high spatial resolution comprising:
    (a) mounting a wafer of polycrystalline ceramic scintillation material on a temporary base plate;
    (b) cutting said wafer into an array of elongated scintillator bars having a width of less than 50 microns;
    (c) mounting lapping pads on said base plate and applying a reflective coating to said wafer which completely fills spaces between individual bars;
    (d) lapping the pads and excess coating down to the wafer and polishing surfaces of said scintillator bars;
    (e) adhering a support plate to the polished surfaces of said array of scintillator bars using said reflective coating;
    (f) lapping off said temporary base plate and wafer surface and polishing front surfaces of said bars;
    (g) cutting said array of bars and attached support plate to final size and adhering an end thereof to an integrated circuit photodetector array; and
    (h) covering exposed surfaces of said array of bars with said reflective coating.

13. The method of claim 12 wherein said cutting in step b is to a depth less than the thickness of said wafer.

14. The method of claim 12 wherein said reflective coating in steps c, e and h is a mixture of epoxy and rutile titanium dioxide particles.

15. The method of claim 12 wherein step g further comprises polishing the end of said array of bars before adhering to said photodetector array.

* * * * *